(12) United States Patent
Shao

(10) Patent No.: US 10,301,078 B2
(45) Date of Patent: May 28, 2019

(54) CONTAINER STOPPER CAPABLE OF BEING RAPIDLY OPENED AND CLOSED

(71) Applicant: Hui Shao, GuangDong (CN)

(72) Inventor: Hui Shao, GuangDong (CN)

( * ) Notice: Subject to any disclaimer, the term of this patent is extended or adjusted under 35 U.S.C. 154(b) by 0 days.

(21) Appl. No.: 15/730,368

(22) Filed: Oct. 11, 2017

(65) Prior Publication Data

US 2018/0050846 A1   Feb. 22, 2018

Related U.S. Application Data

(63) Continuation of application No. PCT/CN2015/094642, filed on Nov. 16, 2015.

(30) Foreign Application Priority Data

May 11, 2015   (CN) .......................... 2015 1 0234891

(51) Int. Cl.
| | |
|---|---|
| *B65D 39/12* | (2006.01) |
| *B65D 39/14* | (2006.01) |
| *B65D 39/16* | (2006.01) |
| *B65D 45/32* | (2006.01) |
| *B67D 1/04* | (2006.01) |
| *F16L 33/22* | (2006.01) |

(52) U.S. Cl.
CPC ............. *B65D 39/12* (2013.01); *B65D 39/14* (2013.01); *B65D 39/16* (2013.01); *B65D 45/322* (2013.01); *B67D 1/0431* (2013.01); *F16L 33/225* (2013.01)

(58) Field of Classification Search
CPC ...... B65D 39/12; B65D 39/14; B65D 45/322; B65D 39/16; B67D 1/0431; F16L 33/225
USPC ........................... 220/233–238; 215/358–361
See application file for complete search history.

(56) References Cited

U.S. PATENT DOCUMENTS

| | | | | |
|---|---|---|---|---|
| 1,363,804 | A | * 12/1920 | Mohn | .................... B65D 39/12 |
| | | | | 215/260 |
| 3,750,822 | A | * 8/1973 | Dubach | .................. B65D 15/14 |
| | | | | 215/361 |

FOREIGN PATENT DOCUMENTS

| | | |
|---|---|---|
| CN | 2043227 | 8/1989 |
| CN | 2594170 | 12/2003 |
| CN | 201801039 | 4/2011 |
| DE | 102012007642 | 10/2013 |

(Continued)

OTHER PUBLICATIONS

International Search Report (English and Chinese) and Written Opinion of International Application No. PCT/CN2015/094642, dated Feb. 3, 2016, 9 pages.

*Primary Examiner* — James N Smalley

(57) ABSTRACT

The invention discloses a container stopper capable of being rapidly opened and closed, comprising a columnar plug body, the plunger body includes a stopper rod, the bottom portion of the stopper rod is provided with a base, the shape and size of the base correspond to the shape and size of the straight section of the container mouth or the minimum cross section of the container, the upper part of the base is provided with an annular plug body, a foldable and deformable elastic seal cartridge is arranged between the annular plug body and the base, the annular plug body and the base can both move mutually along the axial direction of the container in the container mouth under the effect of an external force to press the elastic seal cartridge, and the seal ring and the base together form a sealing layer which realizes the rapid closing of the container.

22 Claims, 10 Drawing Sheets

(56) References Cited

FOREIGN PATENT DOCUMENTS

SU       1570960       6/1990
TW    200640751    12/2006

\* cited by examiner

CONTAINER STOPPER CAPABLE OF BEING RAPIDLY OPENED AND CLOSED

FIELD OF THE INVENTION

The present invention relates to a container cap, in particular to a container stopper capable of being rapidly opened and closed.

BACKGROUND OF THE INVENTION

The existing containers or bottles are generally sealed with threaded stoppers or solid rubber stoppers, which are inconvenient in daily use. Take the threaded stopper as an example, in the use process, cumbersome rotation is required for the opening and closing of the threaded stopper, especially when the temperature is low, the pressure inside the bottle becomes smaller, more effort, strength and time are required to open the bottle stopper. Solid rubber stopper, for example, often needs other auxiliary tools to open, and tends to spend more time, while a rubber stopper which can be opened easily always has poor sealing, limited service life, and is easy to fall into the container after long-term use. Therefore, the existing stopper has the following problems: incapability of rapid opening and closing, inconvenient use due to difficult opening and closing, limited service life due to incapability of repeated opening and closing, poor sealing and leakage-proof performance due to poor closed sealing performance, and poor operability due to the opening under the assistance of other tools.

SUMMARY

The present invention aims to provide a container stopper capable of realizing rapid opening and closing, which is convenient to use, good in sealing property, excellent in heat preservation effect, high in safety, long in service life and low in cost.

The present invention can be realized by the following technical solutions:

A container stopper capable of realizing rapid opening and closing comprises a columnar plug body, an annular plug body and an elastic seal cartridge, wherein the columnar plug body comprises a plunger rod, the bottom of the plunger rod is provided with a base which can be inserted into the container or drawn out from the container, the shape and size of the above-mentioned base correspond to the shape and size of the straight section of the container or the smallest cross section of the container, an annular plug body is arranged above the base, a foldable and deformable elastic seal cartridge is arranged between the annular plug body and the base, the annular plug body and the base can both move mutually along the axial direction of the container in the container under an external force to press the elastic seal cartridge, such that the elastic seal cartridge is radially expanded outwardly to form a seal ring between the inner wall of the container and the outer contour of the base, the outer contour size of the seal ring is larger than the inner surface size of the straight section of the container or the inner surface size of the container at the minimum cross section, and the seal ring and the base together form a sealing layer which realizes the rapid closing of the container. The container stopper capable of being rapidly opened and closed is mainly composed of a columnar plug body, an annular plug body, and an elastic seal cartridge located between the former two, and the columnar plug body and the annular plug body can move mutually to press the elastic seal cartridge for sealing, the structure is simple, the operation is easy and rapid, no matter whether the columnar plug body is pulled upward relative to the annular plug body, or the annular plug body is pressed downward relative to the columnar plug body, the squeeze on the elastic seal cartridge can be realized, so that the elastic seal cartridge expands radially and outwardly to form a seal ring and realize rapid closing of the container, when the external force is released, the elastic seal cartridge restores under the effect of its own elastic force for sealing release, then the container stopper is pulled upward and the container can be opened rapidly. Through the expansion and contraction of the elastic seal cartridge, contact seal and seal release with the container under pressure can be realized, thereby effectively simplifying the opening and/or closing process of the bottle stopper, and being very convenient and fast in use. Rapid opening and/or closing of the container can be realized by adopting the expansion and bending of the elastic seal cartridge, the seal ring and the container are in close-contact seal with no contact dead angle, thereby having good sealing performance and good insulation property. The container stopper is ingenious, simple in structure, low in cost, and easy for scale manufacturing, promotion and application.

Furthermore, a limit seat is arranged above the annular plug body, the limit seat includes a hollow handle and a clamping stand for clamping at the mouth of the container, the clamping stand is set for clamping the container plug at the mouth of the container, and the hollow handle is internally provided with a chute for the mutual movement of the annular plug body and the columnar plug body.

As one of the preferred solutions of the container stopper capable of being rapidly opened and closed in the present invention, the annular plug body and the limit seat are integrally formed or in a split fixed structure, and the annular plug body is located at the bottom of the clamping stand, the top of the plunger rod is provided with a push-pull part which moves axially along the chute on the hollow handle under the external force and pulls the push-pull part upwards to drive the base to move upwards relative to the annular plug body to produce a pressing external force which presses the elastic seal cartridge to seal with the inner wall of the container and realize the rapid closing of the container; when the pressing external force on the elastic seal cartridge is released, the elastic seal cartridge drives the base to move downwards relative to the annular plug body under the effect of an elastic force, the elastic seal cartridge restores to its unbended state, to realize the rapid opening of the container.

As the second preferred solution of the container stopper capable of being rapidly opened and closed of the present invention, the columnar plug and the limit seat are integrally formed or in a split fixed structure, and the top side of the plunger rod is connected to the hollow handle at the top of the limit seat, the annular plug body is located between the limit seat and the plunger rod, and the top part of the annular plug body is provided with a push-pull part, and the push-pull part is provided with a sliding hole penetrating through the plunger rod, and the push-pull part moves axially along the plunger rod and the chute on the hollow handle under the external force, when the push-pull part is pushed downwards, the annular plug body moves downwards to produce a pressing external force to press the elastic seal cartridge to seal with the inner wall of the container and achieve the rapid closing of the container cap; when the pressing external force on the elastic seal cartridge is released, elastic seal cartridge drives the annular plug body to move upwards relative to the base under the effect of an elastic force, the elastic seal cartridge restores its straightened state and realizes rapid opening of the container cap.

Furthermore, the top portion of the elastic seal cartridge is connected to the annular plug body in a nesting or bonding manner.

Furthermore, the bottom of the elastic seal cartridge is fixedly connected to the base in a bonding manner; or the bottom of the elastic seal cartridge is movably connected to the base, and the bottom of the elastic seal cartridge is provided with an inwardly bent portion, which is in close contact with the upper surface of the base.

Furthermore, the push-pull part is of a "-" shaped structure or an annular structure or other common push-pull structure.

Furthermore, the container stopper capable of being rapidly opened and closed further includes a locking structure.

As one of the preferred solutions of the locking structure, the locking structure is a first locking unit and the first locking unit is arranged between the push-pull part and the limit seat.

Furthermore, the first locking unit includes at least one spring locating pin radially positioned in the push-pull part, the push-pull part is provided with a pin slot matching with a spring locating pin, and the limit seat is provided with a locking hole which matches with the spring locating pin.

Furthermore, the number of the spring locating pin is two, and the two spring locating pins are arranged radially relative to each other.

Furthermore, the locking hole is provided with a positioning pin protection cover, and the positioning pin protection cover is engaged with the limit seat.

As the second preferred solution of the locking structure, the locking structure is a second locking unit which is arranged on a plunger rod.

Furthermore, the second locking unit is an elastic locking button, and a locking plate for holding the elastic locking button is arranged between the limit seat and the stopper rod.

Of course, in addition to the above-described two solutions, the locking structure may be other conventional locking structures, such as a push-button locking structure of a ballpoint pen.

Furthermore, a positioning plate is arranged between the limit seat and the plunger rod, and the plunger rod is sleeved with a spring, and the bottom of the spring is fixed to the positioning plate, while the top of the spring is in contact with the push-pull part.

Furthermore, the limit seat is provided with an upper locking hole and a lower locking hole, and the distance between the locking hole and the lower locking hole is an axial movement distance of the push-pull part.

Furthermore, the deformation length of the spring is greater than or equal to the axial movement distance of the push-pull part.

Furthermore, the external force is a force applied by the user to the push-pull part or the spring force applied to the push-pull part by the spring.

Furthermore, the sealing position between the seal ring and the container is located at the bending position of any container below the straight portion of the container; or the sealing position between the seal ring and the container is below the minimum cross-section line of the container.

Furthermore, the outer contour dimension of the columnar plug body, the annular plug body and the elastic seal cartridge is smaller than the minimum cross-sectional dimension of the container, and the outer contour dimension of the elastic seal cartridge means the dimension in a natural state under no pressure from an external force.

Furthermore, the plunger rod is either hollow or solid.

As compared with the prior art, the container stopper capable of being rapidly opened and closed in the present invention has the following beneficial effects:

Firstly, the use is convenient and rapid, the traditional thread design is abandoned, the opening and/or closing operation process of the container is simplified, and the switch between opening and closing can be realized only by pushing downward or pulling upward the push-pull part, thereby the use is convenient and rapid;

Secondly, the sealing is good, the annular plug body and the columnar plug body move mutually in the axial direction under an external force to press the elastic seal cartridge to make it expand radially and outwardly to form the seal ring and realize the sealing of the container, the sealing position between the seal ring and the container is located at the bending position of any container below the straight portion of the container; or the sealing position between the seal ring and the container is below the minimum cross-section line of the container, the outer surface of the seal ring is in close contact with the container and is clamped at the bending point with no sealed dead angles, therefore the sealing is complete and firm with good sealing effect;

Thirdly, the insulation effect is good, the seal ring and the container are sealed in the container bending point below the straight section of the container mouth; or the seal ring and the container are sealed below the minimum section line of the container, on the one hand, the seal is completely firm, the material in the container is well isolated from the environment outside the container, thereby effectively avoiding the contact of the material in the container and the air outside and heat dissipation, and the insulation effect is ensured; on the other hand, due to structural constraints, the mouth of the ordinary thermal-insulating container is generally of a single-layer structure, and the bottom of the mouth of the container is generally of a double-layer vacuum thermal-insulating structure, for such thermal-insulating containers, the seal structure of the container will ensure that the material is controlled in the double-layer vacuum thermal-insulating structure, thereby having good sealing effect and effectively improving the thermal-insulation effect;

Fourthly, the safety is high, the setting of a locking unit can give protection during opening or closing process, and effectively prevent accidents like burning caused by the mal-opening by children;

Fifthly, the service life is long, the container stopper is designed with no thread, so there's no damage to the service life of the container stopper caused by mechanical fatigue of thread rotation, the inconvenient use caused by the deformation of the oak container stopper is avoided, and the service life of the container stopper is effectively prolonged;

Sixthly, the cost is low, the container stopper design is reasonable, simple in structure, easy for processing and large-scale production, and effective in saving processing and manufacturing costs.

Figure 1:
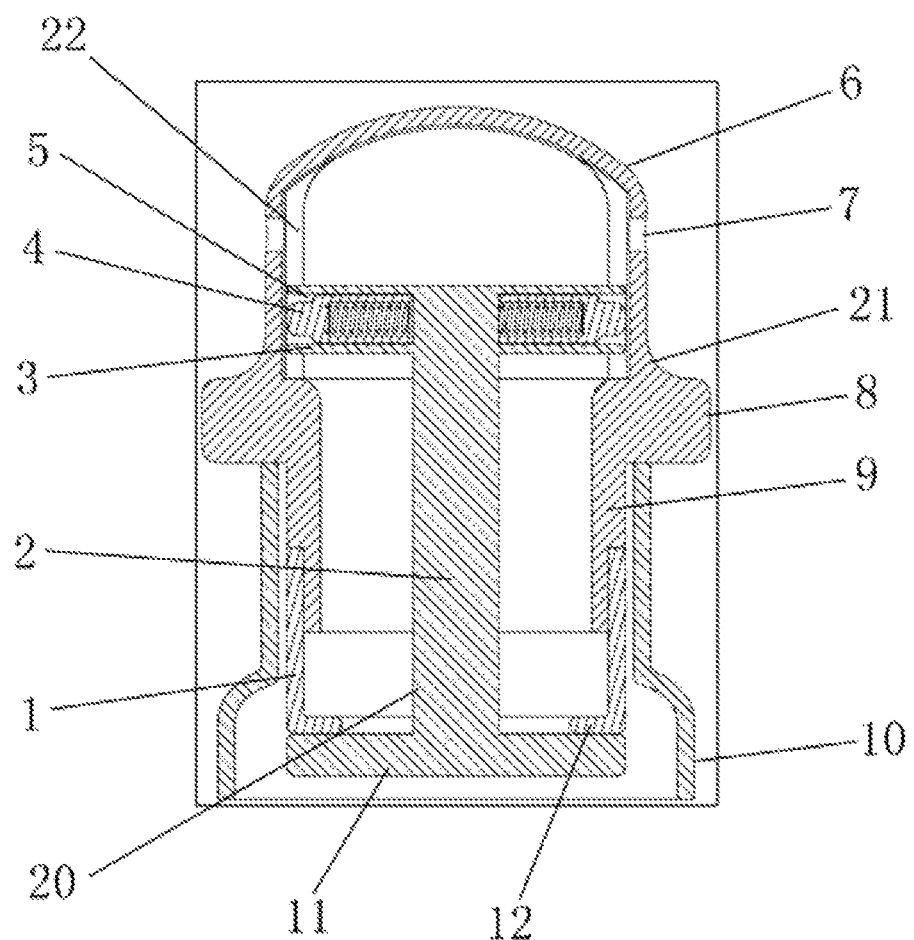
FIG. 1 is a structural schematic diagram illustrating the opening state in embodiment 1 of the container stopper capable of being rapidly opened and closed in the present invention.

The reference numerals are as follows: 1, elastic seal cartridge, 2, plunger rod, 3, push-pull part, 4, spring locating pin, 5, pin slot, 6, hollow handle, 7, locking hole, 8, clamping stand, 9, annular plug body, 10, container, 11, base, 12, bending part, 13, seal ring, 14, positioning plate, 15, spring, 16, upper locking hole, 17, lower locking hole, 18, elastic locking button, 19, lock plate, 20, columnar plug body, 21, limit seat, 22, chute.

DETAILED DESCRIPTION

In order to better understand the technical solution of the present invention by those skilled in the art, the present invention will be described in detail below with reference to the accompanying drawings.

Embodiment 1

Figure 2:
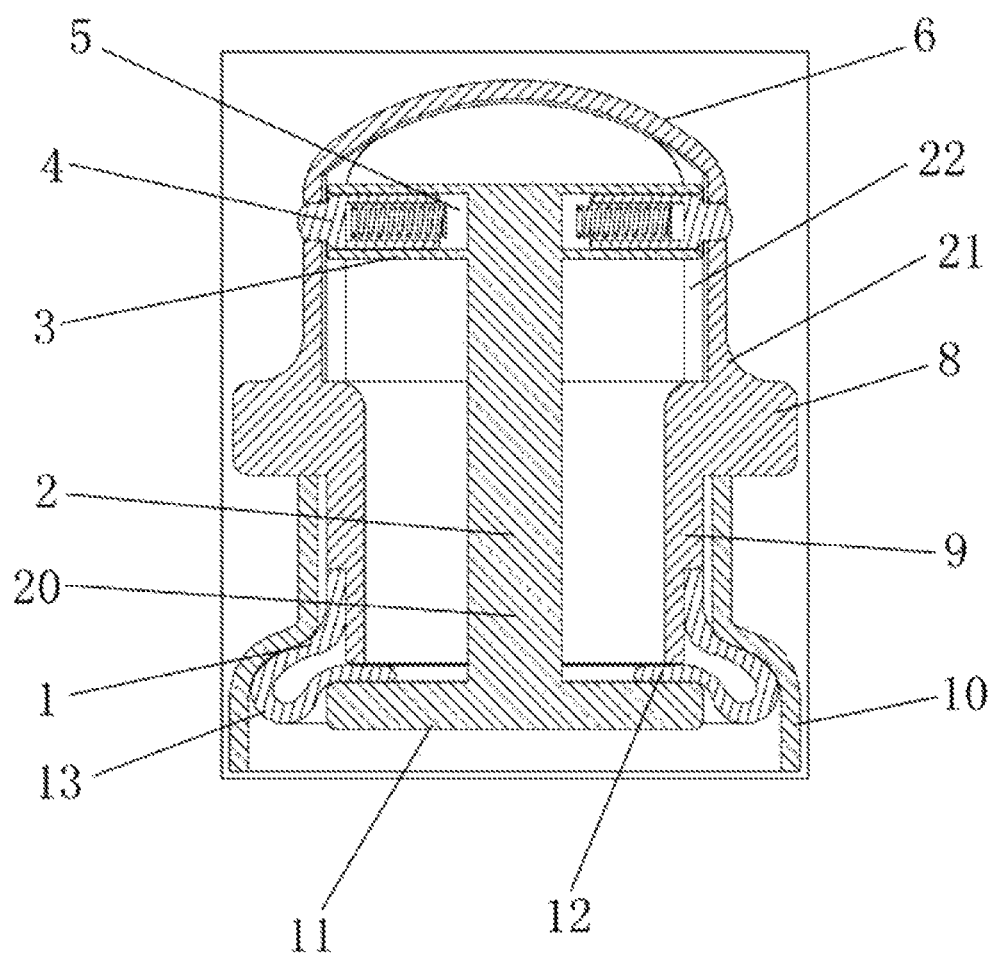
FIG. 2 is a structural schematic diagram illustrating the closing state in embodiment 1 of the container stopper capable of being rapidly opened and closed in the present invention.
Figure 10:
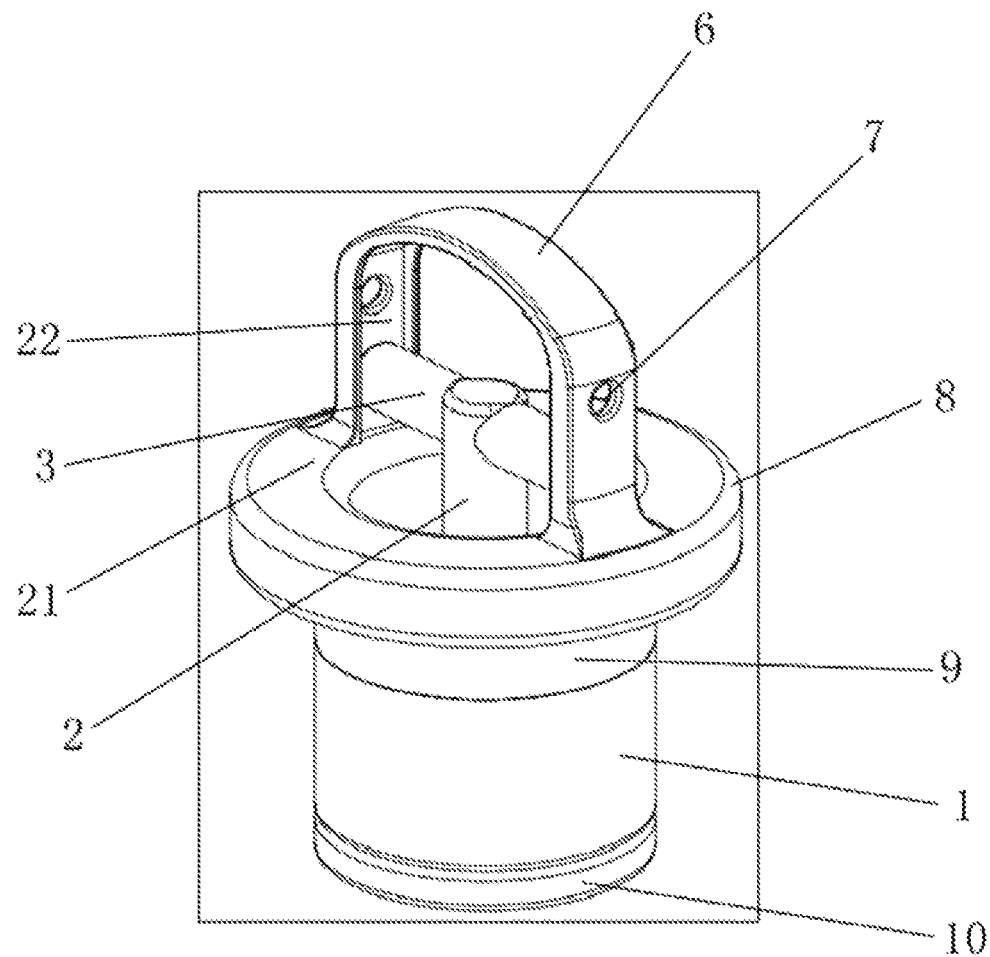
FIG. 10 is a three-dimensional structural schematic diagram of FIG. 1.

As shown in FIGS. 1, 2 and 10, the container stopper capable of being rapidly opened and closed consists of a columnar plug body 20, an annular plug body 9, an elastic seal cartridge 1 and a locking structure, wherein the outer contour size of the columnar plug body 20, the annular plug body 9 and the elastic seal cartridge 1 is smaller than that of the minimum cross-sectional size of the container 10, the columnar plug body 20 includes a plunger rod 2, which can be hollow or solid. The bottom of the plunger rod 2 is provided with a base 11 which can be inserted into the container 10 or drawn out from the container 10, the shape and size of the base 11 are matched to the shape and size of the straight section of the mouth of the container 10 or the minimum cross section of the container 10.

The top of the base 11 is provided with an annular plug body 9; a flexible and deformable elastic seal cartridge 1 is arranged between the annular plug body 9 and base 11. The top of the elastic seal cartridge 1 is connected to the annular plug body 9 in a nesting or bonding manner.

The bottom of the elastic seal cartridge 1 is fixedly connected to the base 11 in a bonding manner; or the bottom of the elastic seal cartridge 1 is movably connected to the base 11, the bottom of the elastic seal cartridge 1 is provided with an inwardly bent portion 12 which is in close contact with the upper surface of the base 11. A limit seat 21 is arranged above the annular plug body 9, and the limit seat 21 includes a hollow handle 6 and a clamping stand 8 for clamping at the mouth of the container 10. The annular plug body 9 and the stopper base 21 are integrally formed or in a split fixed structure, the annular plug body 9 is located at the bottom of the clamping stand 8, and the top of the plunger rod 2 is provided with a push-pull part 3 which moves axially along the chute 22 in the hollow handle 6 under the effect of an external force. The push-pull part 3 is pulled upwards, the base 11 is driven via the stopper rod 2 to move upwards relative to the annular plug 9, to generate a pressing external force to press the elastic gland 1, so that the elastic gland 1 is radially expanded outwardly to form a seal ring 13 between the container 10 and base 11, the seal ring 13, together with the base 11, seals the container 10 to realize rapid closing of the container 10, which is locked by means of a locking structure; when the locking structure is loosened, the pressing force of the elastic seal cartridge 1 is released, and the elastic seal cartridge 1 drives the base 11 to move downward relative to the annular plug body 9 under the effect of the elastic force, and the elastic seal cartridge 1 restores its original unbended state, and at this time, the rapid opening of the container 10 is achieved by pulling the container stopper upward.

As shown in FIGS. 1 and 2, the push-pull part 3 is of a "-" shaped structure, and a space for the penetration of a finger is provided below the "-" shaped structure, so that the finger can be inserted to pull or push the push-pull part 3.

Figure 3:
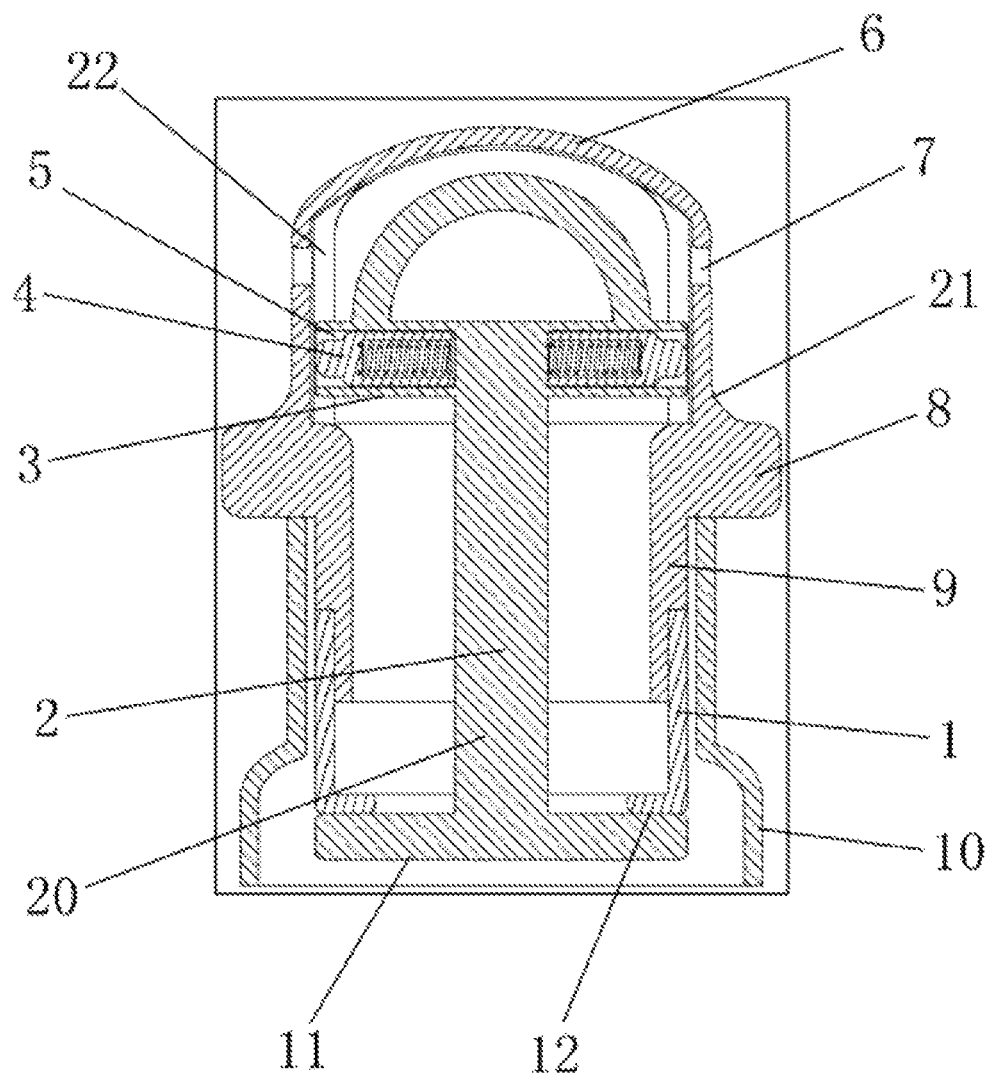
FIG. 3 is a structural schematic diagram of the annular structure of the push-pull part as shown in FIG. 1.

As shown in FIG. 3, the push-pull part 3 is an annular structure for easy operation.

As shown in FIGS. 1 to 3, the sealing position between the seal ring 13 and the container 10 is located at the bending position of any container 10 below the straight portion of the container 10; or the sealing position between the seal ring 13 and the container 10 is below the minimum cross-section line of the container 10, this kind of sealing method ensure full sealing effect and good thermal-insulating effect.

As shown in FIGS. 1 to 3, the locking structure is a first locking unit, and the first locking unit is arranged between the push-pull part 3 and the limit seat 21, and the first locking unit comprises at least one spring locating pin 4, there are two spring locating pins 4 arranged radially opposite to each other, and the spring locating pin 4 is arranged radially in the push-pull part 3, a pin slot 5 which matches with the spring locating pin 4 is arranged on the push-pull part 3, and the limit seat 21 is provided with a locking hole 7 which matches with the spring locating pin 4. The locking hole 7 is provided with a positioning pin protection cover, the positioning pin protection cover is engaged with the limit seat 21. When the container is required to be closed, the push-pull part 3 is pulled upwards to drive upwardly to drive the base 11 to move upwards relative to the annular plug body 9 via the plunger rod 2, to press the elastic seal cartridge 1 to deform it outwardly to realize sealing, and when the spring locating pin 4 of the push-pull part 3 moves upwards to the locking hole 7, the spring locating pin 4 extends into the locking hole 7 under the action of the elastic force, and is locked by the locking hole 7; when the container is required to be opened, the spring locating pin 4 is pressed, namely, the pressing external force on the elastic seal cartridge 1 is released, under the effect of the elastic force, elastic seal cartridge 1 restores its original place and drives the base 11 to move downwards relative to the annular plug body 9, and the elastic seal cartridge 1 restores to its original unbended state, and rapid opening of the container 10 can be realized by pulling the container stopper upwards.

As shown in FIGS. 1 to 3, the external force is the force applied by the user to the push-pull part 3 or the spring force exerted by the spring 15 on the push-pull part 3.

Embodiment 2

Figure 4:
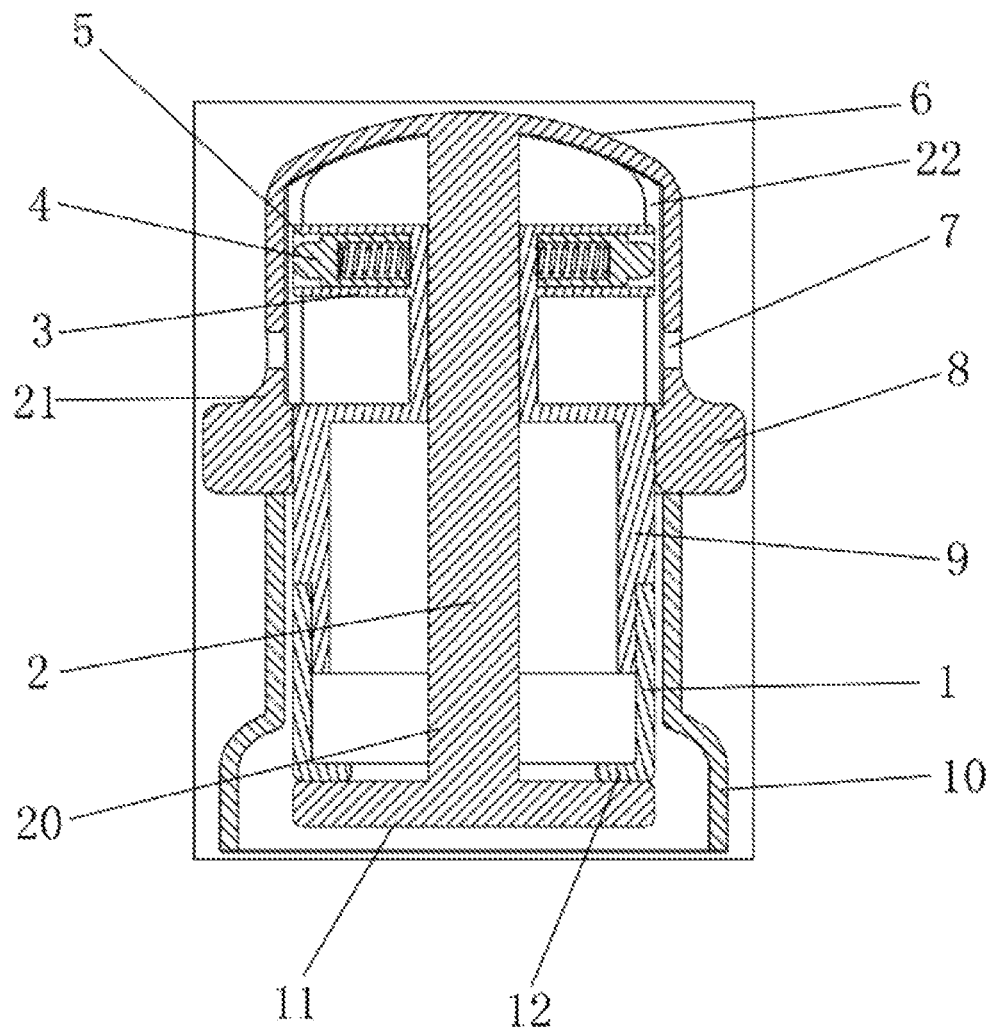
FIG. 4 is a structural schematic diagram illustrating the opening state in embodiment 2 of the container stopper capable of being rapidly opened and closed in the present invention.
Figure 5:
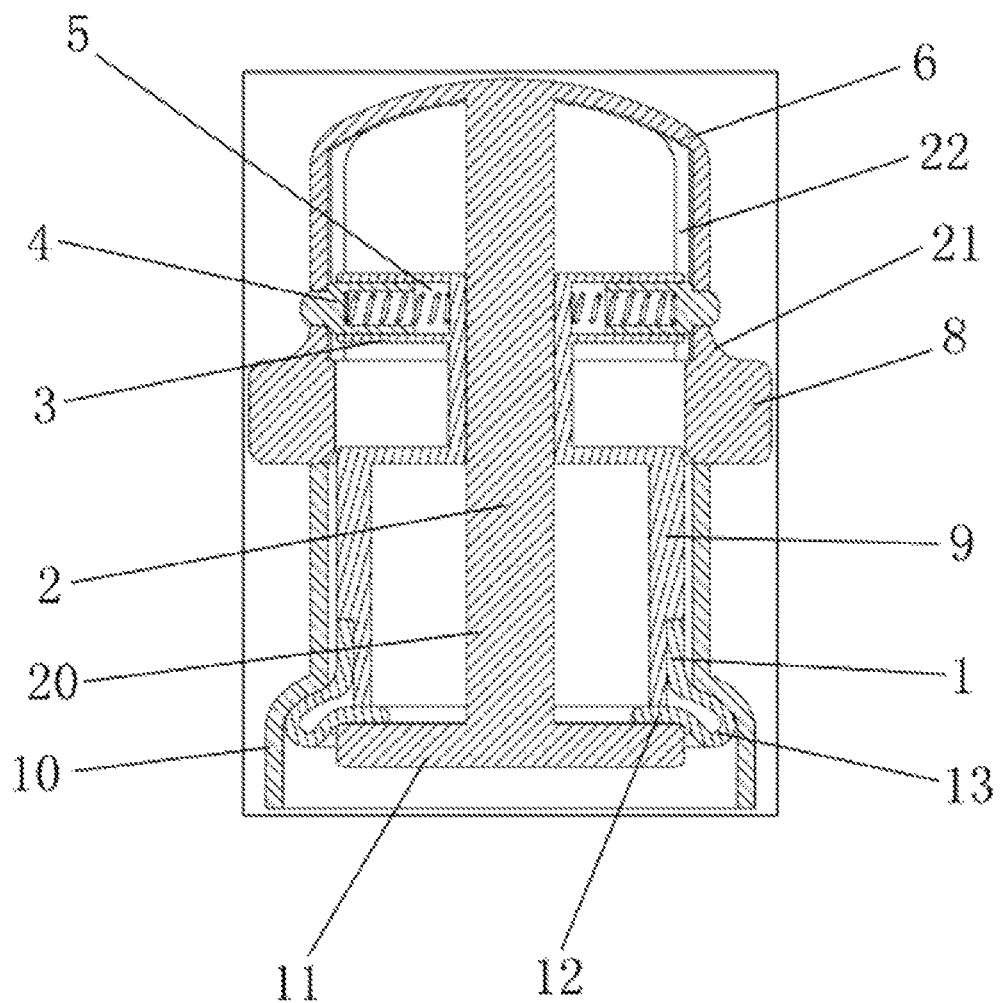
FIG. 5 is a structural schematic diagram illustrating the closing state in embodiment 2 of the container stopper capable of being rapidly opened and closed in the present invention.

As shown in FIGS. 4 and 5, the present embodiment has basically the same structure and principle as embodiment 1, with the following differences: in embodiment 1, an annular plug body 9 and the limit seat 21 are integrally formed or in a split fixed structure, in the present embodiment, a columnar plug body 9 and the limit seat 21 are integrally formed or in a split fixed structure, and the top of the plunger rod 2 is connected to the top of the limit seat 21, the annular plug body 9 is located between the limit seat 21 and the plunger rod 2, the top of the annular plug 9 is provided with a push-pull part 3 which is provided with a sliding hole for the penetration of the plunger rod 2, and under the effect of an external force, the push-pull part 3 moves axially along the plunger rod 2 and the chute 22 in the hollow handle 6, when the push-pull part 3 is pushed downwards, the annular plug body 9 moves downwards to generate a pressing force to press the elastic seal cartridge 1 to cause the elastic seal cartridge 1 to expand radially and form a seal ring 13 between the container 10 and the base 11, and the seal ring 13 and the base 11 together seal the container 10, and realize the rapid closing of the container 10. Meanwhile, the spring locating pin 4 on the push-pull part 3 moves downwardly to the locking hole 7 along with the annular plug body 9, and the spring locating pin 4 extends into the locking hole 7 under the effect of the elastic force, and locking is done via the locking hole 7; the elastic locking button 4 is pressed down, namely, the pressing external force on the elastic seal cartridge 1 is released, the elastic seal cartridge 1 restores to its original place under the effect of its own elastic force and drives the annular plug body 9 to move upwards relative to the base 11, the elastic seal cartridge 1 restores to its original unbended state, and the container 10 can be quickly opened by pulling the container stopper upwards.

Embodiment 3

Figure 6:
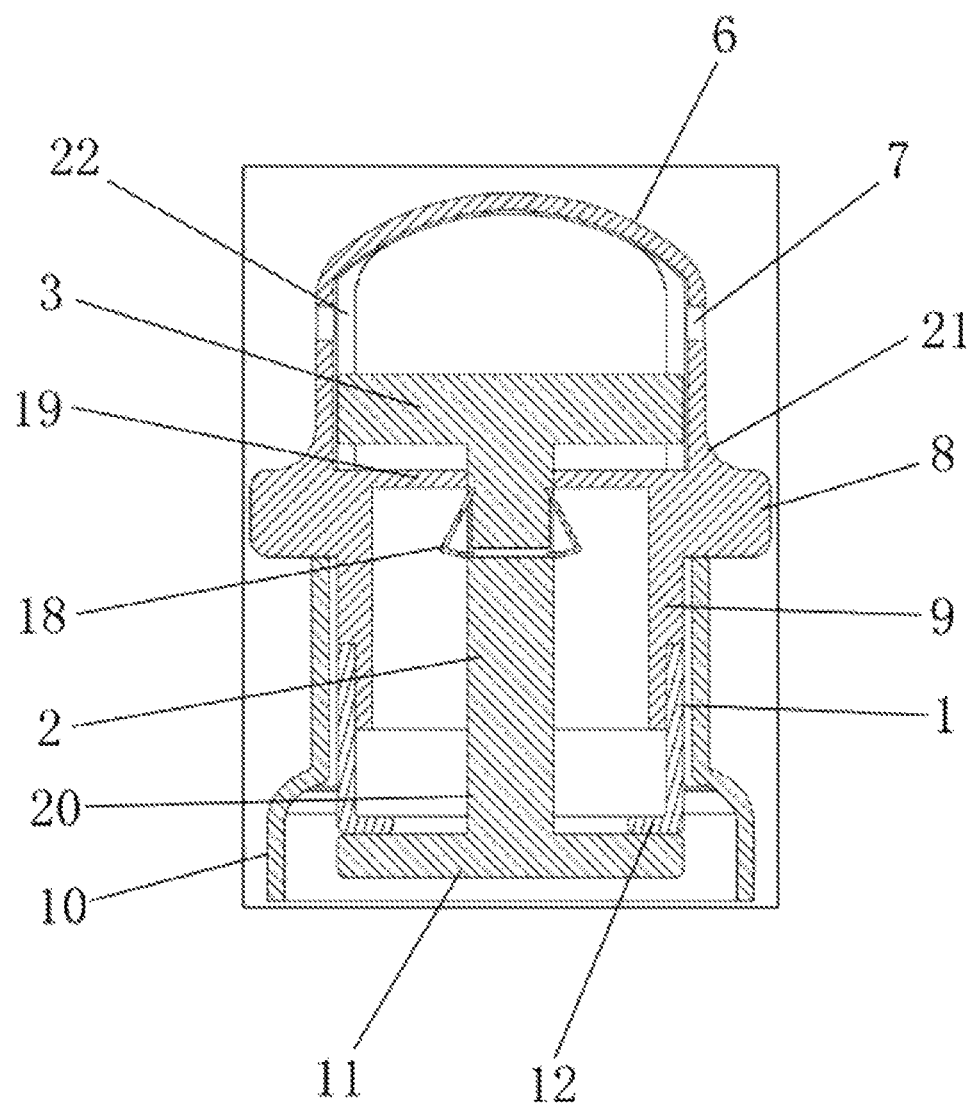
FIG. 6 is a structural schematic diagram illustrating the opening state in embodiment 3 of the container stopper capable of being rapidly opened and closed in the present invention.
Figure 7:
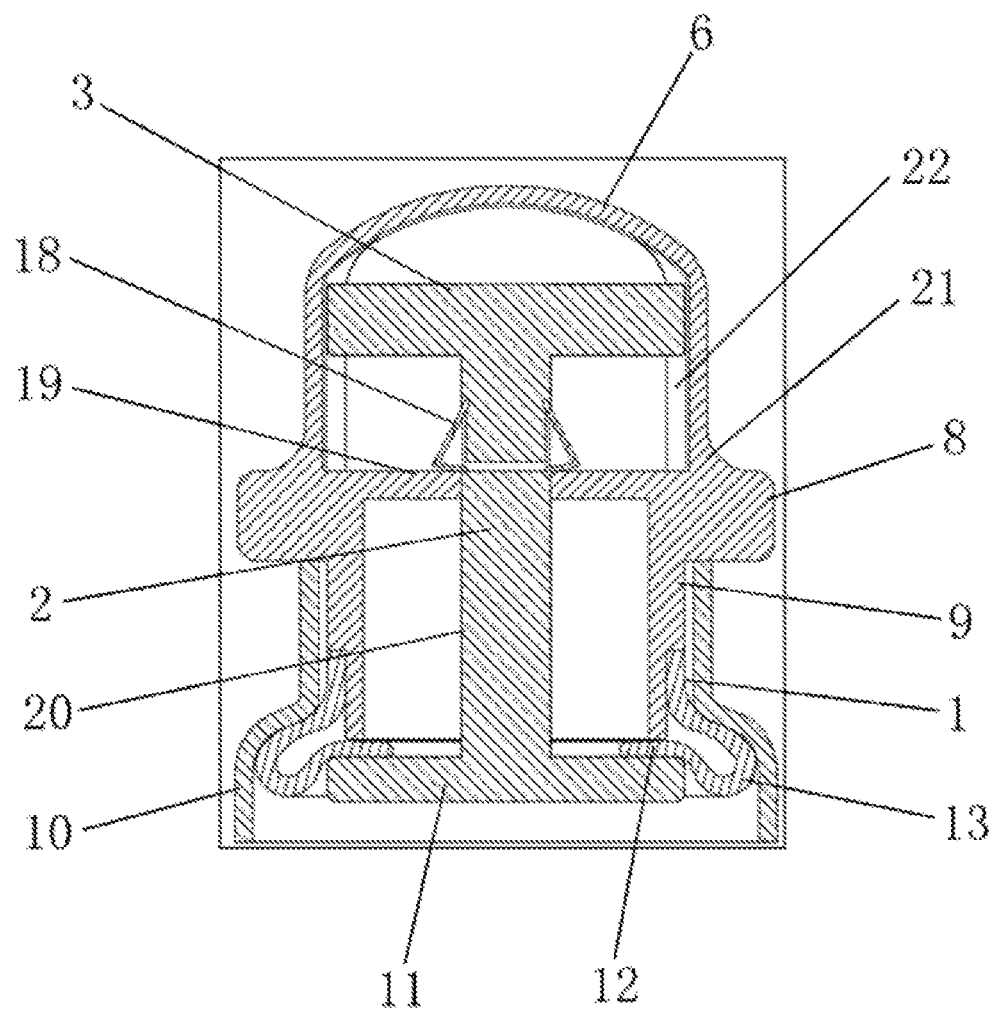
FIG. 7 is a structural schematic diagram illustrating the closing state in embodiment 3 of the container stopper capable of being rapidly opened and closed in the present invention.

As shown in FIG. 6 and FIG. 7, the present embodiment has basically the same structure and principle as embodiment 1, but has the following difference: the locking structure in the present embodiment is a second locking unit which is an elastic locking button 18, the elastic locking button 18 is arranged on the plunger rod 2, and a locking plate 19 which clamps the elastic locking button 18 is arranged between the limit seat 21 and the plunger rod 2. When the container is required to be closed, the push-pull part 3 is pulled upwards and the base 11 is driven to move upwards against the annular plug body 9 via the plunger rod 2, to press the elastic seal cartridge 1 to be deformed outwardly to achieve sealing, and the plunger rod 2 moves upwards, the elastic locking button 18 thereon is driven to move upwards and penetrates through the locking plate 19 and is locked by the locking plate 19. When the container is required to be opened, the elastic locking button 18 is pressed down to push down the push-pull part 3, the base 11 moves downwards relative to the annular plug body 9 via the plunger rod 2, to release the external force of the elastic seal cartridge 1, and the elastic seal cartridge 1 restores to its original place under its own elastic force, that is, it restores to the original unbended state, and the container 10 is quickly opened only by pulling upwards the container stopper.

Embodiment 4

Figure 8:
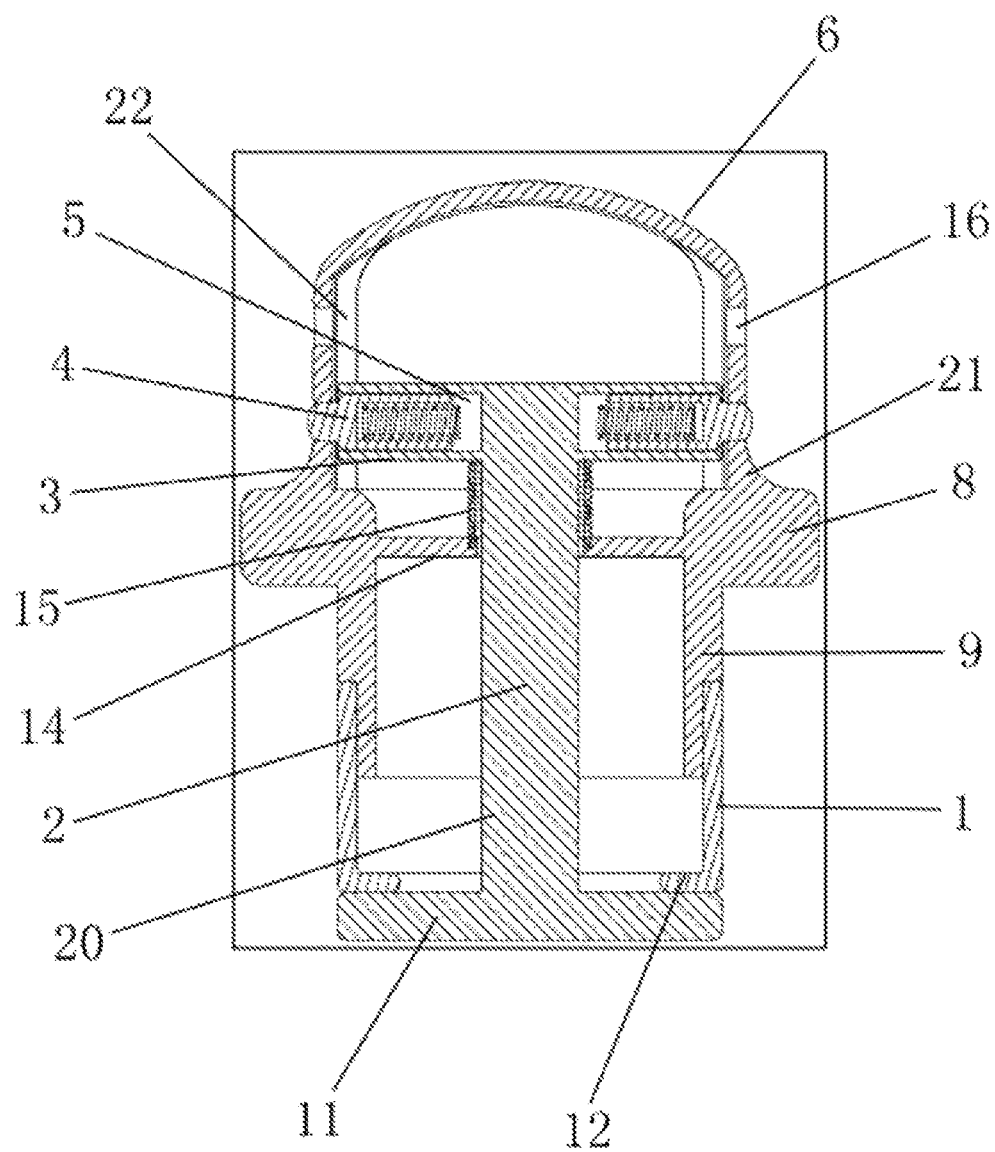
FIG. 8 is a structural schematic diagram illustrating the opening state in embodiment 4 of the container stopper capable of being rapidly opened and closed in the present invention.
Figure 9:
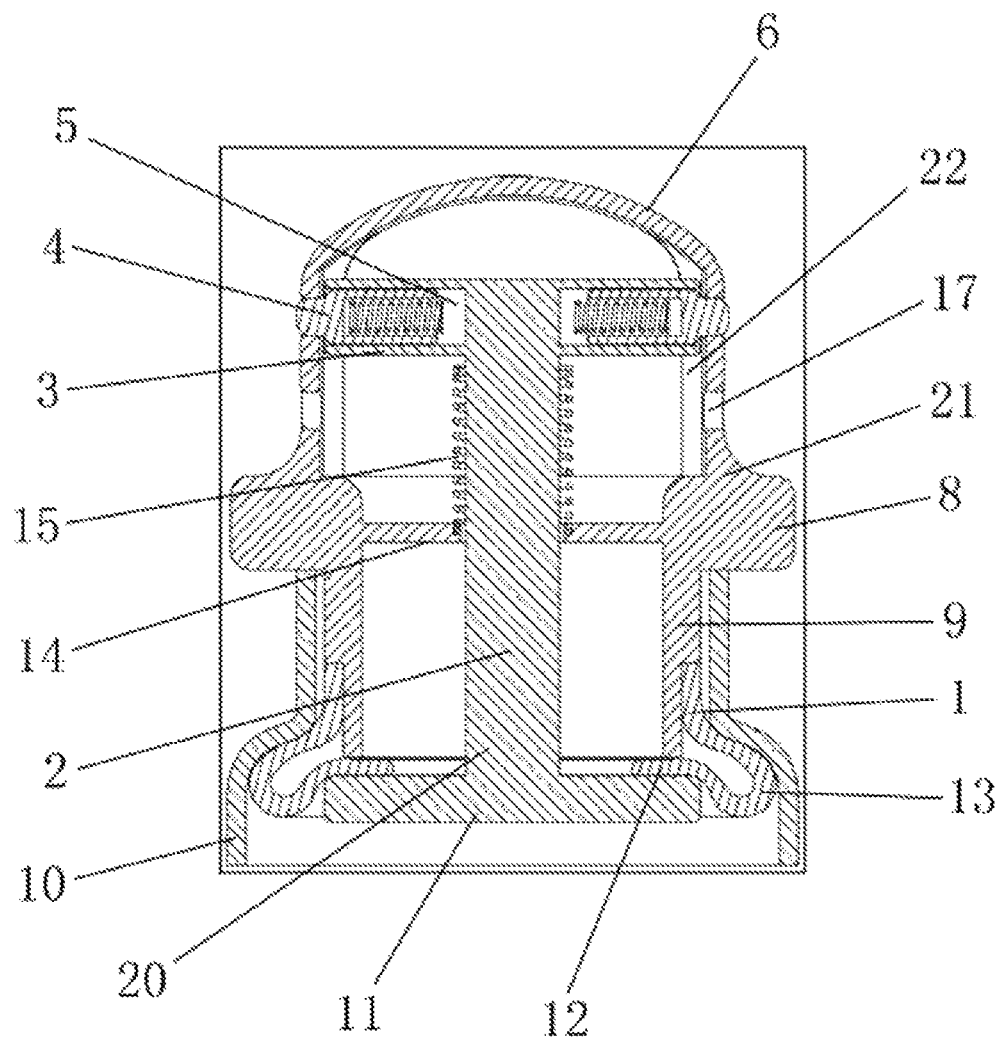
FIG. 9 is a structural schematic diagram illustrating the closing state in embodiment 4 of the container stopper capable of being rapidly opened and closed in the present invention

As shown in FIGS. 8 and 9, the present embodiment has basically the same structure and principle as embodiment 1, but different from the above several embodiments in which the pressing external force is from the user, the pressing external force of the present embodiment comes from the spring 15, the specific structure is as follows: a positioning plate 14 is arranged between the limit seat 21 and plunger rod 2, the plunger rod 2 is sleeved with a spring 15, the bottom of the spring 15 is fixed at the positioning plate 14 while the top of the spring 15 is in contact with the push-pull part 3. The limit seat 21 has an upper locking hole 16 and a lower locking hole 17, the distance between the upper locking hole 16 and the lower locking hole 17 is an axial movement distance of the push-pull part 3. The deformation length of the spring 15 is greater than or equal to the axial movement distance of the push-pull part 3. When the container is in a naturally unused state, that is, when the container is in an unsealed state, the spring 15 is in a compressed state and the spring locating pin 4 of the push-pull part 3 is locked by the lower locking hole 7, the elastic seal cartridge 1 is in an original state under no pressure, the spring 15 is released by pressing the spring locating pin 4 and the spring 15 is pushed upwards to push the push-pull part 3 to move upwards, the base 11 is driven to move upwards to press the elastic seal cartridge to seal it with the container 10, then, the spring locating pin 4 of the push-pull part 3 moves to the upper locking hole 16 and is locked by the upper locking hole 16 to effectively avoid the fluctuation of the spring 15 caused by the contact with the container 10. As a result, when the container is required to be opened, the spring locating pin 4 in the locking hole 16 is pressed downwards and the push-pull part 3 is pressed downwards, then the pressing force against the elastic seal cartridge 1 can be released, and the elastic seal cartridge 1 restores to its original place by its own elastic force, that is, restores to its original unbended state, and the rapid opening of the container 10 can be realized by pulling the container stopper.

What is described above is only preferred embodiments of the present invention, rather than limiting the present invention in any form; those skilled in the art can smoothly implement the present invention based on what is shown in the accompanying drawings and what is described above; however, without departing from the scope of the technical solution of the present invention, those skilled in the art can make some variations, modifications and changes based on the technical contents disclosed above, and those variations, modifications and changes all belong to equivalent embodiments of the present invention; meanwhile any equivalent variations, modifications and changes made to the above embodiments based on the substantial techniques of the present invention shall all fall within the protection scope of the technical solution of the present invention.

The invention claimed is:
1. A container stopper for a container and capable of being rapidly opened and closed, comprising:
 a columnar plug body including a plunger rod having a bottom provided with a base for being disposed in the container, a shape and size of the base corresponding to one of a shape and size of a straight section of the container or a shape and size of a smallest cross section of the container;

an annular plug body arranged above the base, the annular plug body and base configured to move relative to each other along an axial direction of the container; and a foldable and deformable elastic seal cartridge arranged between the annular plug body and the base, the base and annular plug body are configured to press the elastic seal cartridge when an external force is applied to a push-pull part such that the elastic seal cartridge radially expands outward to form a seal ring between an inner wall of the container and an outer contour of the base, wherein when the external force on the push-pull part is released, an elastic force of the elastic seal cartridge causes an increase in a distance between the base and the annular plug body that restores the elastic seal cartridge to a less bent state, and an outer contour size of the seal ring is larger than one of an inner surface size of the straight section of the container or the smallest cross section of the container, and the seal ring and the base together form a sealing layer for the rapid closing of the container.

2. The container stopper according to claim 1, wherein a limit seat is arranged above the annular plug body, and the limit seat includes a hollow handle and a clamping stand for clamping at a mouth of the container.

3. The container stopper according to claim 2, the annular plug body and the limit seat are integrally formed or in a split fixed structure, the annular plug body is located at a bottom of the clamping stand, and a top of the plunger rod is provided with the push-pull part, the external force moving the push-pull part axially along a chute of the hollow handle, when the external force pulls the push-pull part upward, the base is driven to move upward relative to the annular plug body via the plunger rod to generate a pressing external force on the elastic seal cartridge such that the elastic seal cartridge is sealed with the inner wall of the container by the seal ring to provide the rapid closing of the container, and when the pressing external force on the elastic seal cartridge is released, an elastic force of the elastic seal cartridge drives the base to move downwards relative to the annular plug body restoring the elastic seal cartridge to the less bent state and providing the rapid opening of the container.

4. The container stopper according to claim 2, wherein the columnar plug body and the limit seat are integrally formed or in a split fixed structure, a top part of the plunger rod is connected with the hollow handle at a top of the limit seat, the annular plug body is located between the limit seat and the plunger rod, a top part of the annular plug body is provided with the push-pull part that includes a sliding hole penetrating through the plunger rod, the push-pull part is configured to move axially along the plunger rod and a chute on the hollow handle when the external force pushes the push-pull part downwards, the annular plug body is driven to move downward relative to the base to generate a pressing external force on the elastic seal cartridge such that the elastic seal cartridge is sealed with the inner wall of the container by the seal ring to provide the rapid closing of the container, and when the pressing external force on the elastic seal cartridge is released, an elastic force of the elastic seal cartridge drives the annular plug body to move upward relative to the base restoring the elastic seal cartridge to the less bent state and providing the quick opening of the container.

5. The container stopper according to claim 3, wherein a top of the elastic seal cartridge is connected with the annular plug body in a nesting or bonding manner.

6. The container stopper according to claim 5, wherein the bottom of the elastic seal cartridge is one of:
fixedly connected to the base in a bonding manner, or
movably connected with the base, and the bottom of the elastic seal cartridge is provided with an inwardly bent part which is in close contact with an upper surface of the base.

7. The container stopper according to claim 5, wherein the push-pull part is of a "-" shaped structure or an annular structure.

8. The container stopper according to claim 5, comprising:
a locking structure.

9. The container stopper according to claim 8, wherein the locking structure is a locking unit arranged between the push-pull part and the limit seat.

10. The container stopper according to claim 9, wherein the locking unit comprises at least one spring locating pin radially positioned in the push-pull part, the push-pull part including a pin slot matching with the at least one spring locating pin, the limit seat including a locking hole matching with the at least one spring locating pin.

11. The container stopper according to claim 10, wherein the at least one spring locating pin includes a second spring locating pin, and the two spring locating pins are arranged radially relative to each other.

12. The container stopper according to claim 10, wherein the locking hole is provided with a locating pin protective cover that is engaged with the limit seat.

13. The container stopper according to claim 8, wherein the locking structure is a locking unit arranged on the plunger rod.

14. The container stopper according to claim 13, wherein the second locking unit is an elastic locking button, and a locking plate clamps the elastic locking button and is arranged between the limit seat and the plunger rod.

15. The container stopper according to claim 2, wherein a positioning plate is arranged between the limit seat and the plunger rod, the plunger rod is sleeved with a spring that has a top and a bottom, the bottom of the spring is fixed to the positioning plate, and the top of the spring contacts the push-pull part.

16. The container stopper according to claim 15, wherein the limit seat is provided with an upper locking hole and a lower locking hole, and a distance between the upper locking hole and the lower locking hole is equal to the axial movement distance of the push-pull part.

17. The container stopper according to claim 16, wherein a deformation length of the spring is greater than or equal to the axial movement distance of the push-pull part.

18. The container stopper according to claim 1, wherein a top of the plunger rod includes a push-pull part configured to move axially with the plunger rod,
wherein the external force is one of:
a force applied by a user to the push-pull part, or
a spring force exerted by a spring on the push-pull part.

19. The container stopper according to claim 1, wherein contact between the seal ring and the inner wall of the container is located at one of:

a bending position of the container disposed below the straight portion of the container; or below a cross-sectional line along the smallest cross-section of the container.

20. The container stopper according to claim 1, wherein each of an outer contour size of the columnar plug body, an outer contour size of the annular plug body, and an outer contour size of the elastic seal cartridge is smaller than that of the smallest cross-sectional size of the container.

21. The container stopper according to claim 1, wherein the less bent state of the elastic seal cartridge is an unbent state of the elastic seal cartridge.

22. The container stopper according to claim 1, comprising:
- a locking unit comprising a spring locating pin, wherein
- a limit seat is arranged above the annular plug body, the limit seat including a clamping stand for clamping at a mouth of the container and a locking hole matching with the spring locating pin, the annular plug body and the limit seat integrally formed or in a split fixed structure, the locking unit arranged between the push-pull part and the limit seat, and
- a top of the plunger rod is provided with the push-pull part, the spring locating pin radially positioned in a locking hole of the push-pull part.

* * * * *